United States Patent
Kothari et al.

(10) Patent No.: US 10,983,801 B2
(45) Date of Patent: Apr. 20, 2021

(54) LOAD/STORE ORDERING VIOLATION MANAGEMENT

(71) Applicant: Apple Inc., Cupertino, CA (US)

(72) Inventors: Kulin N. Kothari, Cupertino, CA (US); Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/562,675

(22) Filed: Sep. 6, 2019

(65) Prior Publication Data

US 2021/0072997 A1    Mar. 11, 2021

(51) Int. Cl.
  *G06F 9/38*  (2018.01)
  *G06F 9/30*  (2018.01)

(52) U.S. Cl.
  CPC ........ *G06F 9/3867* (2013.01); *G06F 9/30043* (2013.01)

(58) Field of Classification Search
  None
  See application file for complete search history.

(56) References Cited

U.S. PATENT DOCUMENTS

| | | | |
|---|---|---|---|
| 7,159,154 B2 | 1/2007 | Lee et al. | |
| 7,165,167 B2 * | 1/2007 | Filippo | G06F 9/3842 712/225 |
| 10,268,481 B2 | 4/2019 | Yu et al. | |
| 2002/0199063 A1 * | 12/2002 | Chaudhry | G06F 9/383 711/122 |
| 2004/0255101 A1 * | 12/2004 | Filippo | G06F 9/3826 712/225 |
| 2014/0215190 A1 * | 7/2014 | Mylius | G06F 9/3834 712/220 |
| 2015/0293577 A1 * | 10/2015 | Hall | G06F 9/30065 713/320 |
| 2016/0170757 A1 * | 6/2016 | Col | G06F 9/3834 712/217 |
| 2016/0328237 A1 | 11/2016 | Di et al. | |
| 2016/0357568 A1 * | 12/2016 | Col | G06F 9/3824 |
| 2017/0185408 A1 * | 6/2017 | Wright | G06F 11/3648 |

* cited by examiner

*Primary Examiner* — Hyun Nam
(74) *Attorney, Agent, or Firm* — Kowert, Hood, Munyon, Rankin & Goetzel, P.C.; Lawrence J. Merkel

(57) ABSTRACT

A processor includes a load/store unit that includes one or more load pipelines and one or more store pipelines. Load operations may be issued into the load pipelines out of order with respect to older store operations. If a load operation is executed out or order with an older store operation that writes one or more bytes read by the load operation, and if the store operation is issued shortly after the load operation, such that the load operation is still in the load pipeline when the store operation is issued, some cases of flushing may be converted to replays by detecting the ordering violation while the load operation is still in the load pipeline.

20 Claims, 7 Drawing Sheets

LOAD/STORE ORDERING VIOLATION MANAGEMENT

BACKGROUND

Technical Field

Embodiments described herein are related to processors and, more particularly, to ordering load and store operations in processors.

Description of the Related Art

Processors use load/store operations to access memory. Load operations read data from memory into the processor, and store operations write data from the processor to memory. For example, load operations can read data into processor registers that can be used as operands of other instructions, and store operations can write data from the processor registers to memory.

The data read by the load operations is often needed as operands for other instructions in the processor, while store operations are often used to write result data to memory after computation on the results is completed (at least temporarily). Accordingly, performing the load operations is often more performance-critical than performing the store operations. Thus, high performance processors are designed to perform load memory operations out of order (compared to the program order of the operations). The load operations execute out of order with respect to older store operations if the load operations do not read data that is written by the store operations. That is, if one or more bytes read by the load operation overlap with one or more bytes written by the store operation, the load cannot execute out of order with the older store because the overlapping byte(s) from the store need to be reflected in the load data. When there is no overlap, correct operation can occur with the out of order execution of the load operation (although there may be other ordering constraints in some cases).

If a load executes out of order with an older store which writes one or more bytes read by the load, a load/store ordering violation has occurred and the processor takes corrective action. Typically, if the data has been forwarded to the other instructions that use the load data as operands, the load operation and subsequent instructions are flushed and refetched, discarding any speculatively generated results. Flushing reduces performance of the processor, and can consume significant power as well. To mitigate the performance/power loss, some processors employ a predictor to predict when a load/store ordering violation is likely to occur (based on previously detected flushes). However, the predictor is trained by the detection of flushes and thus initial instances of the load/store ordering violation are not avoided using the predictor. Additionally, the predictor is finite and thus cannot retain all predictions indefinitely, requiring retraining when a prediction has been replaced and then the corresponding ordering violation occurs again.

SUMMARY

A processor includes a load/store unit that includes one or more load pipelines and one or more store pipelines. The load pipelines execute load operations and the store pipelines execute store operations. Load operations may be issued into the load pipelines out of order with respect to older store operations. If a load operation is executed out or order with an older store operation that writes one or more bytes read by the load operation, the load/store unit may detect the ordering violation when the older store operation is executed and the load operation and subsequent operations may be flushed from the processor. However, if the store operation is issued shortly after the load operation, such that the load operation is still in the load pipeline when the store operation is issued, some cases of flushing may be converted to replays by detecting the ordering violation while the load operation is still in the load pipeline. More particularly, the load pipeline may include a stage that corresponds to an end of a shadow kill window in which operations which are dependent on the load operation and were speculatively scheduled assuming the load would hit in the cache and complete may be cancelled without flushing the dependent operations. When the load operation reaches that stage, store operation that are in stages of the store pipelines which have address information available (e.g. a virtual address and/or a physical address) may compare the store address information to corresponding address information for the load operation. If there is a hit, and the corresponding store operation is older than the load operation in program order, then the load may be replayed and the dependent operations may be killed via the shadow kill window mechanism and rescheduled when the load is replayed. The performance and power cost for replaying a load operation may be less than a flush, and thus performance and power efficiency may be increased, in some embodiments.

BRIEF DESCRIPTION OF THE DRAWINGS

The following detailed description makes reference to the accompanying drawings, which are now briefly described.

Figure 1:
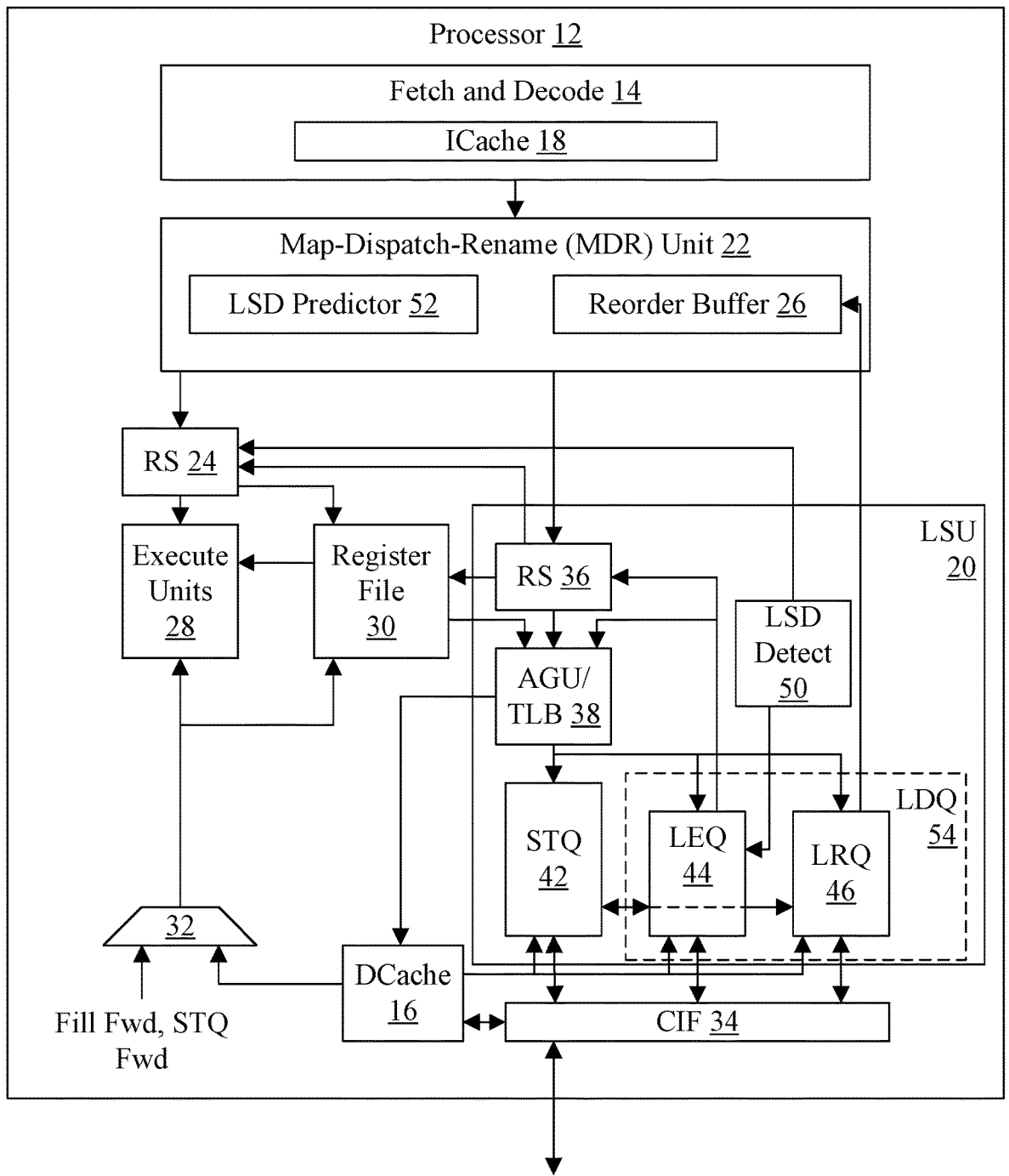
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch and decode unit 14 (including an instruction cache, or ICache, 18), a map-dispatch-rename (MDR) unit 22 (including a load/store dependency (LSD) predictor 52 and a reorder buffer 26), one or more reservation stations 24, one or more execute units 28, a register file 30, a data cache (DCache) 16, a load/store unit (LSU) 20, and a core interface unit (CIF) 34. The fetch and decode unit 14 is coupled to the MDR unit 22, which is coupled to the reservation stations 24 and the LSU 20. More particularly, the MDR unit 22 is coupled to a reservation station (RS) 36 in the LSU 20. The reservation stations 24 are coupled to the execution units 28. The reorder buffer 26 is coupled to a load retirement queue (LRQ) 46 in the LSU 20. The register file 30 is coupled to the execute units 28 and the LSU 20 (and more particularly the reservation station 36 and an address generation unit/translation lookaside buffer (AGU/TLB) 38). The AGU/TLB 38 is also coupled to the DCache 16, which is coupled to the CIF 34 and to a multiplexor 32 which is coupled to the execute units 28 and the register file 30. Another input of the mux 32 is coupled to receive other data (e.g. fill forward data from the CIF 34 and/or store queue forward data from a store queue 42 (STQ 42) in the LSU 20. The DCache 16 is further coupled to the STQ 42, the LRQ 46, and a load execute queue (LEQ) 44 in the LSU 20. The AGU/TLB 38 is coupled to the reservation station 36, the STQ 42, the LEQ 44, and the LRQ 46. The STQ 42 is coupled to the LEQ 44 and the LRQ 46, and the STQ 42, the LEQ 44, and the LRQ 46 are coupled to the CIF 34. The LEQ 44 is also coupled to the RS 36. The LSU 20 further includes an LSD detect circuit 50 coupled to the RS 24 and the LEQ 44. The LSD detect circuit 50 is further coupled to one or more load pipelines and one or more store pipelines in the LSU 20 (shown in FIGS. 2-5 below). The load and store pipelines include stages that are coupled to the various components in the LSU 20 as shown in FIG. 1, e.g. as described below with regard to FIGS. 2-5.

The fetch and decode unit 14 may be configured to fetch instructions for execution by the processor 12 and decode the instructions into ops for execution. More particularly, the fetch and decode unit 14 may be configured to cache instructions previously fetched from memory (through the CIF 34) in the ICache 18, and may be configured to fetch a speculative path of instructions for the processor 12. The fetch and decode unit 14 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 14 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the instruction operation may be essentially synonymous with instruction (although it may be modified in form by the decoder). The term "instruction operation" may be more briefly referred to herein as "op."

The MDR unit 22 may be configured to map the ops to speculative resources (e.g. physical registers) to permit out-of-order and/or speculative execution, and may dispatch the ops to the reservation stations 24 and the LSU 20. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The MDR unit 22 may manage the mapping of the architected registers to physical registers. There may be separate physical registers for different operand types (e.g. integer, media, floating point, etc.) in an embodiment. In other embodiments, the physical registers may be shared over operand types. The MDR unit 22 may also be responsible for tracking the speculative execution and retiring ops or flushing misspeculated ops. The reorder buffer 26 may be used to track the program order of ops and manage retirement/flush.

Ops may be scheduled for execution when the source operands for the ops are ready. In the illustrated embodiment, decentralized scheduling is used for each of the execution units 28 and the LSU 20, e.g. in reservation station 36 in the LSU 20 and reservation stations 24 for other execution units 28. Other embodiments may implement a centralized scheduler if desired.

The LSU 20 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 36, which may be configured to monitor the source operands of the operations to determine when they are available and then issue the operations to the load or store pipelines, respectively. The AGU/TLB 38 may be coupled to one or more initial stages of the pipelines, as discussed below. Some source operands may be available when the operations are received in the reservation station 36, which may be indicated in the data received by the reservation station 36 from the MDR unit 22 for the corresponding operation. Other operands may become available via execution of operations by other execution units 28 or even via execution of earlier load ops. The operands may be gathered by the reservation station 36, or may be read from a register file 30 upon issue from the reservation station 36 as shown in FIG. 1.

In an embodiment, the reservation station 36 may be configured to issue load/store ops out of order (from their original order in the code sequence being executed by the processor 12, referred to as "program order") as the operands become available. To ensure that there is space in the LRQ 46 or the STQ 42 for older operations that are bypassed by younger operations in the reservation station 36, the MDR unit 22 may include circuitry that preallocates LRQ 46 or STQ 42 entries to operations transmitted to the load/store unit 20. If there is not an available LRQ entry for a load being processed in the MDR unit 22, the MDR unit 22 may stall dispatch of the load op and subsequent ops in program order until one or more LRQ entries become available. Similarly, if there is not a STQ entry available for a store, the MDR unit 22 may stall op dispatch until one or more STQ entries become available. In other embodiments, the reservation station 36 may issue operations in program order and LRQ 46/STQ 42 assignment may occur at issue from the reservation station 36.

The LRQ 46 may track loads from initial execution to retirement by the LSU 20. The LRQ 46 may be responsible for ensuring the memory ordering rules are not violated (between out of order executed loads, as well as between loads and stores). If a memory ordering violation is detected, the LRQ 46 may signal a redirect for the corresponding load. A redirect may cause the processor 12 to flush the load and subsequent ops in program order, and refetch the corresponding instructions. Speculative state for the load and subsequent ops may be discarded and the ops may be refetched by the fetch and decode unit 14 and reprocessed to be executed again.

Because redirects are costly (e.g. in both performance lost and power consumed), the processor 12 may implement various mechanisms to attempt to avoid redirects. For example, the LSD predictor 52 may be provided to predict load ops that may experience an ordering violation with an older store op. The LSD predictor 52 may identify the earlier store op, and a dependency of the load op on the store op may be indicated so that the load op is not speculatively issued prior to the store op. The LSD predictor 52 may be trained by the LRQ 46 when flush events for ordering violations are detected.

The LEQ 44, on the other hand, may track loads from initial execution to completion. A load may be complete when it has successfully forwarded data to its target register (and thus ops dependent on the load may be speculatively executed) and the load may not be replayed. Completed loads may subsequently be redirected due to memory ordering violations or other issues detected by the LRQ 46, but may not attempt to forward data again without a redirect. Most loads may forward data without replay may be immediately complete. There may be some loads, in some embodiments, which may successfully forward data and yet may not be complete. For example, certain load ops may be derived from "atomic" instructions, and may be subject to replay to verify that the access remained atomic. Other embodiments may implement atomicity in other fashions.

Since load/store ops may be executed out of order, it is possible that load/store ordering violations will occur. As mentioned above, the LRQ 46 may ensure that any ordering violations are detected and cause a flush when detected. More particularly, the LRQ 46 may compare the store physical address of a store (and corresponding size information) to the load physical address (and size information) of a younger load that executed out of order with respect to the store. If a hit is detected (e.g. at least one byte written by the store is read by the load, also referred to as an overlap between the load and the store), the LRQ 46 may flush the load. The LSD predictor 52 may be used to predict ordering violations and prevent the out of order scheduling based on the prediction. However, the LSD predictor 52 may be a finite structure and thus may not be able to store data to predict all previously-detected ordering violations. Additionally, the LSD predictor 52 may not be able to predict an ordering violation prior to the first detection of the ordering violation (and the corresponding flush).

In some cases, the ordering violation may be detected during execution of the load op and a replay of the load op may be signaled instead of a redirect/flush. For example, when a load op is issued out of order with respect to a store that writes at least one byte read by the load, there are many cases in which the store op (or particularly the store address op) is issued within a small number of clock cycles of the load. The LSD detect circuit 50 may be provided to detect the ordering violations while the load ops may still be replayed, e.g. in cases where the store address op is issued and has address information available for comparison while the load may still be replayed. When the load op is replayed, the load op is executed after the store address op for which the ordering violation was detected and thus the ordering violation is corrected via the replay. The load op may again be replayed if the store data is not available, but the ordering violation has been prevented. In some embodiments, the LSD detect circuit 50 may also train the LSD predictor 52 to predict the ordering violation, to prevent the occurrence in the future. In other embodiments, since the LSD detect circuit 50 successfully detects the ordering violation and prevents a flush, the LSD detect circuit 50 may not train the LSD predictor 52. Other ordering violations that the LSD detect circuit 50 does not detect may be predicted by the LSD predictor 52, which may lead to increased performance. Alternatively, a smaller LSD predictor 52 may be used to support a given level of performance if the LSD detect circuit 50 does not train the LSD predictor 52 for ordering violations detected by the LSD detect circuit 50.

In an embodiment, the load op may be replayed up until the stage corresponding to a close of the shadow kill window for the load op. The processor 12 may support the speculative scheduling of ops that depend on a load, responsive to the issuance of the load. As shown in FIG. 1, the RS 36 may be coupled to the RS 24 to indicate the scheduling of load ops, so that the RS 24 may speculatively schedule dependent ops if the other operands of the dependent ops are ready. An op is dependent on a load if the op uses at least a portion of the data that is accessed by the load as a source operand. The dependent ops may be scheduled so that they arrive at the forwarding stage of their pipelines (e.g. the input to the execution units 28) at the same time as the load data would be forwarded for a cache hit in the DCache 16 (or a hit in the STQ 42 with data available to be forwarded). However, it is possible that the load op will miss the DCache 16 or be replayed for other reasons (including detection of an ordering violation by the LSD detect circuit 50, and other causes described below). Thus, the reservation stations 24 may hold the speculatively issued ops until it is known that the load successfully forwards data. The ops may thus be cancelled and rescheduled from the RS 24 if the load is not successfully completed. The window of clock cycles/time from possible speculative scheduling to the point at which successful completion is known is referred to as the shadow kill window, and ops may be cancelled (or "killed") at any time in the shadow kill window.

When a load op reaches the stage corresponding to the close of the shadow kill window, the LSD detect circuit 50 may compare the load address information of the load to corresponding address information for the store address ops that are in execution to determine if the load op was issued out of order with a store address op corresponding to a store that is older than the load op and the store writes at least one byte that is read by the load. If such an ordering violation is detected, the LSD detect circuit 50 may cause a replay of the load op. For example, the LSD detect circuit 50 is coupled to the LEQ 44 in the embodiment of FIG. 1, and may signal the replay to the LEQ 44. Additionally, the LSD detect circuit 50 may communicate a shadow kill to the RS 24, identifying the load op so that any speculatively-scheduled dependent ops may be cancelled and retained for rescheduling. The shadow kill indication may actually be transmitted on a subsequent clock cycle, e.g. the next succeeding clock cycle in an embodiment, depending on timing requirements or other implementation-dependent considerations. As mentioned above, store address ops may generate the address of the store and thus the address of the load op may be compared to the addresses from store address ops. Store data ops may not generate an address and thus there may be nothing to compare for the store data ops. Store address ops will be used as an example for the remainder of this discussion, but embodiments that keep the store address and store data portions together as a single store op may be supported as well.

More particularly, the LSD detect circuit 50 may be coupled to various store pipeline stages and may receive address information from the pipeline stages. The address information may generally include any information that identifies the bytes that are written by a store (or aids in the determination of the bytes written by the store). Thus, the address information may include one or more addresses corresponding to the store. For example, the virtual address generated by the AGU/TLB 38 during execution of a store address op may be address information, as may be the physical address to which the virtual address translates. Size information, indicating the number of bytes updated by the store beginning with the byte indicated by the address, may also be address information. Some address information may be available for comparison at earlier pipeline stages than others, as mentioned below. Accordingly, the accuracy of the ordering violation detection may vary depending on which stage the store address op is in when detection of the violation for a given load op is performed.

The LSD detect circuit 50 may not always have enough information to detect a given ordering violation, but ordering violations not detected by the LSD detect circuit 50 may be detected by the LRQ 46 and flushed, so correct operation may be still be ensured. For example, for some stages of the store pipeline, the store virtual address may be available but not the store physical address. If the virtual addresses match, then there may be an ordering violation. However, in the case where multiple virtual addresses are aliased to the same physical address, the violation may not be detected by virtual address comparison. Aliasing is not frequently encountered and so the virtual address may be a good proxy for the physical address in most cases. Similarly, if the size information is not available, overlapping accesses that have different starting addresses may not be detected. However, overlapping accesses with different starting addresses may not occur frequently, so an address compare without size information may be a good proxy in most cases.

When a load/store address op is issued by the reservation station 36, the AGU/TLB 38 may be configured to generate the address accessed by the load/store, and may be configured to translate the address from an effective or virtual address created from the address operands of the load/store address op to a physical address actually used to address memory. The AGU/TLB 38 may be configured to generate an access to the DCache 16. For load operations that hit in the DCache 16, data may be speculatively forwarded from the DCache 16 to the destination operand of the load operation (e.g. a register in the register file 30), unless the address hits a preceding operation in the STQ 42 (that is, an older store in program order) or the load is replayed. The data may also be forwarded to dependent ops that were speculatively scheduled and are in the execution units 28.

The execution units 28 may bypass the forwarded data in place of the data output from the register file 30, in such cases. If the store data is available for forwarding on a STQ hit, the mux 32 may select data output by the STQ 42 for forwarding and the load need not be replayed due to the STQ hit. Cache misses and STQ hits where the data cannot be forwarded may be reasons for replay and the load data may not be forwarded in those cases. The cache hit/miss status from the DCache 16 may be logged in the STQ 42 or LRQ 46 for later processing.

The load operations may update the LRQ 46 entry preassigned to the load operations, and the store operations may update the STQ 42, to enforce ordering among operations. In one embodiment, the instruction set architecture implemented by the processor 12 may permit memory accesses to different addresses to occur out of order but may require memory accesses to the same address (or overlapping addresses, where at least one byte is accessed by both overlapping memory accesses) to occur in program order.

Additionally, loads may be replayed one or more times before successfully completing by forwarding data to the target register, in an embodiment. A replay occurs when a condition is detected during execution of the load, which prevents the load from forwarding data to its target location (e.g. its target register in the register file 30) but the condition may be temporary and thus re-executing the load at a later point may allow the load to successfully forward data and complete. As mentioned above, a load/store ordering violation detected by the LSD detect circuit 50 may be a cause of replay. There may be other causes of replay as well. For example, during execution, addresses of loads are compared to the stores in the STQ 42. If the load is to the same address as an older store in the STQ 42, and the data is not available for forwarding from the STQ 42 (e.g. the corresponding store data op has not executed), the load may be replayed so that the store data may be forwarded later (or the store may complete and the data may be available from the DCache 16). The virtual address of the load may miss in the TLB within the AGU/TLB 38, and thus the address may not be translated. The load may be replayed to obtain the translation and access the DCache 16. A load may miss in the DCache 16 and thus may be replayed to obtain the data later when the missing data is supplied to the DCache 16 in a cache fill (either as a fill forward or replaying through the DCache 16 as a cache hit after the fill). Resource conflicts may be a source of replays (e.g. a bank conflict in the DCache 16 and/or the TLB in the AGU/TLB 38 with a concurrently executing load/store op may cause the younger op to be replayed). Some loads may also require additional conditions in order to complete (e.g. they may need to be the oldest load, or may need to be non-speculative, due to the definition of the instruction from which the load is derived and/or attributes associated with the address in the translation). Accordingly, a given load may have an initial execution (issued from the reservation station 36, passing through the execution pipeline including the AGU/TLB 38 and DCache 16 access) and, if replayed during the initial execution, one or more additional execution passes through the load pipeline initiated from the LEQ 44. That is, replay may occur again during a replay execution pass due to a different conflict than the original replay, or possibly the same conflict in some cases.

The LEQ 44 may be used to manage replays. That is, a given load op may be allocated an LEQ entry when initially executed (e.g. issued by the RS 36), and the LEQ entry may be retained to replay the load until it successfully forwards data. The LEQ entry may be freed upon successfully data forwarding/completion of the given load op. The given load op may still have an entry in the LRQ 46 after completion, however, for ordering purposes.

The LEQ 44 need not have as many entries as the LRQ 46 to support the desired performance of the processor 12. A majority of loads under ordinary circumstances do not get replayed. That is, the majority of loads are issued by the RS 36, execute, and successfully forward data on the initial execution. Thus, the majority of loads have an LEQ entry 44 for only a short time, and then the entry is freed because the load did not replay. Because the LEQ 44 may be smaller than the LRQ 46, searching the LEQ 44 for loads that are ready to be replayed may be relatively low latency (as compared to the latency than might occur if the LRQ 46 were to be searched). Thus, the replays may be lower latency that would otherwise be possible if only the LRQ 46 were used, in an embodiment. For example, replays may be at least one clock cycle lower latency than would be possible if the LRQ 46 were used, in an embodiment.

The LSU 20 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 36 may issue any number of loads up to the number of load pipes in the same clock cycle. In an embodiment, the LEQ 44 may be banked and the number of banks may be equal to the number of load pipelines. Each LEQ bank may replay load ops on a respective one of the load pipes. That is, the LEQ bank may be dedicated to the respective load pipe and may only replay its loads on the respective load pipe. In an embodiment, allocation of a given load to one of the banks may be not be restricted to which pipe initially executes the given load. That is, loads may be allocated LEQ entries in any bank, independent of the load pipe in which they initially execute. If a given load replays, however, the replays occur on the load pipe based on which bank has the entry allocated to that given load. The replay path from the LEQ 44 is illustrated as the connection of the LEQ 44 to the AGU/TLB 38, in an embodiment. There may be parallel paths for each load pipe. In an embodiment, replays take priority over loads to be issued by the reservation station 36. Accordingly, the LEQ 44 may signal the reservation station 36 when a given load pipe is being used for replay, and the reservation station 36 may stall issue on that given load pipe for that clock cycle.

The LSU 20 may also implement one or more store pipes, and in particular may implement multiple store pipes. The number of store pipes need not equal the number of load pipes, however. In an embodiment, for example, two store pipes may be used. The reservation station 36 may issue store address ops and store data ops independently and in parallel to the store pipes.

The CIF 34 may be responsible for communicating with the rest of a system including the processor 12, on behalf of the processor 12. For example, the CIF 34 may be configured to request data for DCache 16 misses and ICache 18 misses. When the data is returned, the CIF 34 may signal the cache fill to the corresponding cache. For DCache fills, the CIF 34 may also inform the LSU 20 (and more particularly the LEQ 44 and the LRQ 46). The LEQ 44 may attempt to schedule replayed loads that are waiting on the cache fill so that the replayed loads may forward the fill data as it is provided to the DCache 16 (referred to as a fill forward operation). If the replayed load is not successfully replayed during the fill, the replayed load may subsequently be scheduled and replayed through the DCache 16 as a cache hit. The LRQ 46 may track cache hit/miss status and thus may be informed of cache fills so that the cache hit/miss status may be updated. The CIF 34 may also writeback modified cache lines that have been evicted by the DCache 16, merge store data for non-cacheable stores, etc.

The execution units 28 may include any types of execution units in various embodiments. For example, the execution units 28 may include integer, floating point, and/or media (vector) execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data. Media ops/execution units may more generally be vector ops/execution units.

Thus, each execution unit 28 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 28 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

While the illustrated embodiment employs the LEQ 44 and LRQ 46 for load ops, other embodiments may employ a single load queue with a single entry for each load op that handles replays and redirects/flushes. The combination of the LEQ 44 and LRQ 46 may equivalently be a load queue (LDQ) 54.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 2:
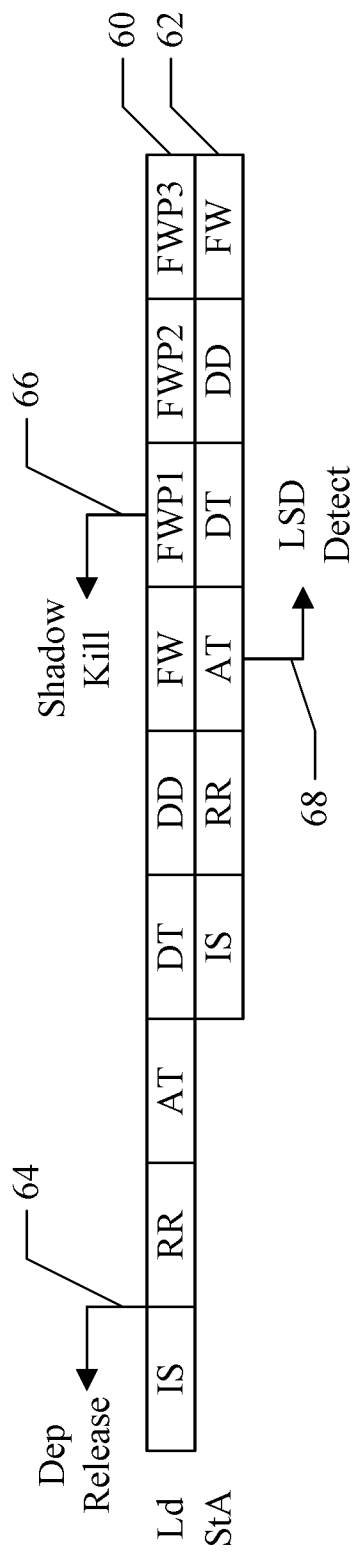
FIG. 2 is a block diagram illustrating one embodiment of a load pipeline and a store pipeline, and detection of a load/store ordering violation for a store at a first state of the store pipeline.
Figure 3:
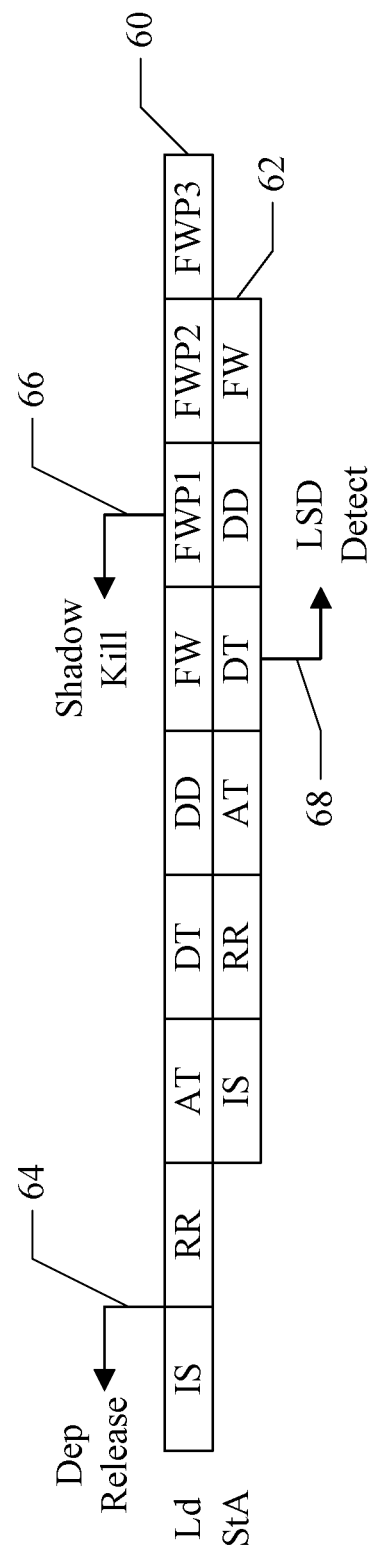
FIG. 3 is a block diagram illustrating one embodiment of a load pipeline and a store pipeline, and detection of a load/store ordering violation for a store at a second state of the store pipeline.
Figure 4:
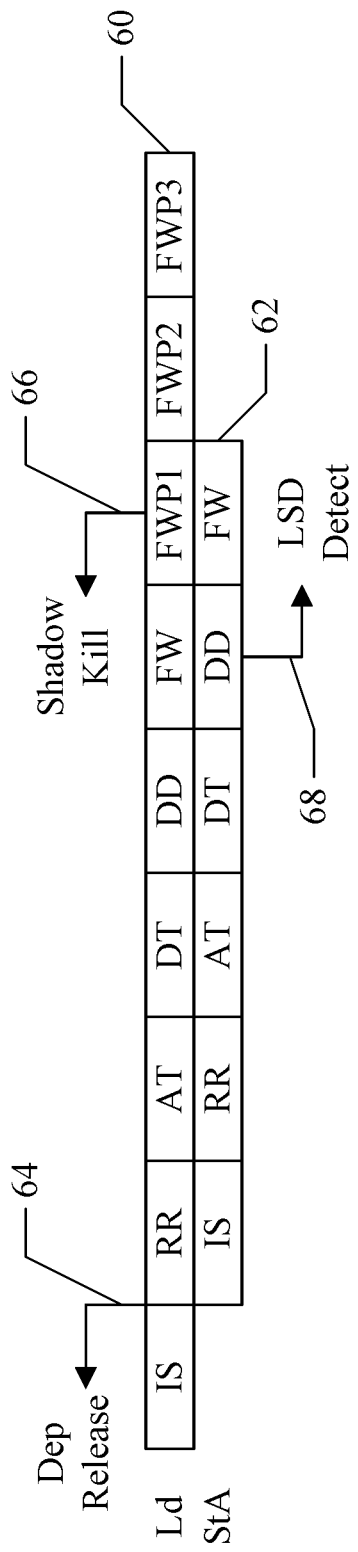
FIG. 4 is a block diagram illustrating one embodiment of a load pipeline and a store pipeline, and detection of a load/store ordering violation for a store at a third state of the store pipeline.

Turning now to FIGS. 2-4, block diagrams of a portion of a load pipeline 60 and a portion of a store pipeline 62 is shown. The pipeline stages are offset from each other in FIGS. 2-4 to show the stages that a load op ("Ld") and a store address op ("StA") that was issued after the load op are in at the same clock cycle. That is, the stages that are aligned vertically in FIGS. 2-4 are stages in which the load op and the store op are being processed in a given clock cycle for each case. For example, the load op is in the DT stage at the same cycle that the store address op is in the IS stage in FIG. 2. As mentioned previously, a store address op is used as an example in this discussion. However, the discussion generally applies to a store op. The store address information may generally correspond to the store op from the which the store address op was generated.

The pipeline stages shown in FIGS. 2-4 are one example of pipeline stages that may be used for load pipeline 60 and store pipeline 62. There may be multiple instances of the load pipeline 60 and/or the store pipeline 62 to permit concurrent processing of multiple loads and stores, respectively. For example, in one embodiment, there may be three load pipelines 60 and two store pipelines 62. Other embodiments may implement more or fewer load pipelines and/or store pipelines. Other embodiments may implement different stages, and/or may divide the execution tasks for loads and stores in different fashions among the stages.

In the illustrated embodiment, the stages include issue (IS), register read (RR), address generation and translation (AT), data tag lookup (DT), data read (DD), forward (FW), forward plus one (FWP1), forward plus two (FWP2), and forward plus 3 (FWP3). In the IS stage, the load or store op is selected by the reservation station 36 for execution, and is issued. In the RR stage, the source operands are read from the register file 30 and/or the operands are bypassed from the producer op (e.g. from one of the execution units 28 or from a load pipeline 60). In the AT stage, for load ops and store address ops, the address operands are added by the AGU/TLB 38 to generate the virtual address of the op. The data cache 16 data array access and the TLB tag array access may be started in the AT stage as well, in an embodiment. In an embodiment, way prediction is implemented to predict the way of the data cache 16 that will hit, and the way prediction may be made in the AT stage. In the DT stage, the TLB data array access may be performed and the hitting translation (if any) maybe provided by the AGU/TLB 38. Thus, at the end of the DT stage, the physical address of the load op or store address op may be available. The data cache 16 tag array may be accessed using an index portion of the virtual address in the DT stage as well. In an embodiment, the load virtual address may be compared to the addresses in the STQ 42 and other structures in the DT stage (e.g. the fill buffer for data cache fills, and a store merge buffer in the CIF 34, etc.) to detect forwarding from the STQ 42 or other structures, replays due to hits on the STQ 42 or other structures when data is not yet ready, etc. The comparisons may be completed in the DD stage and the forwarding path may be selected in the mux 32, in an embodiment, or the data from the data cache 16 may be processed to select the accessed data to be forwarded for a load op through the mux 32 in the DD stage as well. The data cache tags may be compared to the physical address in the DD stage to detect cache hit (and validate the way prediction in embodiments that implement the way prediction). In the FW stage, the load data may be forwarded. Additionally, in the FW stage, the physical address of the load may be compared to the STQ 42 and other structures to detect cases in which the virtual address compare did not match but the physical address did match (address aliasing). These cases cause a shadow kill, in this embodiment. For stores, the store physical address may be compared to the LRQ 46 in the FW stage to detect redirects for ordering violations.

Accordingly, one or more stages of the pipelines may have address information available for the load/store being executed in the pipeline. For example, in this embodiment, the AT stage may be an initial stage at which address information is available. Subsequent stages (e.g. the DT and DD stages) may have address information available as well. The available address information may be more accurate as the op proceeds through the stages. For example, the DT stage is subsequent to the AT stage and may have more accurate address information that the AT stage. The DD stage is subsequent to the DT stage and may have more accurate address information than the AT or DT stages. Generally, pipeline stages may have an order in which the op proceeds through the pipeline. A stage may be referred to as subsequent to another stage if the op is processed in the stage after it is processed in the other stage. A stage may be between two other stages if an op is processed in a first stage of the other two stages, then the stage, then the second stage of other two stages. Thus, the DT stage may be between the AT stage and the DD stage in this embodiment.

When a load is selected for issue, the reservation station 36 may inform other reservation stations 24 that the load is being issued and dependent operations may be released from their dependencies on the load, pending possible shadow kill ("Dep Release" 64 in FIGS. 2-4). The reservation station 36 may indicate that the load is being issued in any fashion. For example, dependencies may be tracked by register address and the reservation station 36 may broadcast the destination register address of the load to the reservation stations 24. The register address may be a physical register address assigned by the MDR unit 22, for example. Alternatively, dependencies may be tracked by op and an identifier of the op may be broadcast. For example, a reorder buffer number (RNUM) identifying a reorder buffer entry in the reorder buffer 26 that corresponds to the load may be broadcast. The receiving reservation stations 24 may mark the dependent ops (if any) as being schedulable, although actual issuance may be delayed based on the latency to the end of the register read stage for the dependent ops compared to the FW stage of the load. For example, if a reservation station 24 issues a dependent op and the RR stage is the next stage, the issuance may be delayed until the load op reaches the DD stage. Also, the dependent ops may only be scheduled by the reservation stations 24 is other dependencies (e.g. for other source operands) have been previously satisfied as well.

In the illustrated embodiment, the shadow kill window closes at the FW stage of the load pipeline. Other embodiments may have the shadow kill window closure at other stages, based on the capabilities of the reservation stations 24 and execute units 28 to cancel dependent instructions. In the illustrated embodiment, the shadow kill is actually transmitted in the following clock cycle (the FWP1 stage of the load, "Shadow Kill" 66 in FIGS. 2-4). However, the shadow kill conditions may be determined in the FW stage and, in some embodiments, preceding stages. In an embodiment, one shadow kill indication may be provided for a given load op, e.g. the shadow kill 66, even if some shadow kill causes are detected in earlier stages than others. In another embodiment, two or more shadow kill transmissions may be provided for a given load op from different stages of the load pipeline 60. The shadow kill indication may include an identifier of the load op (e.g. the register address or RNUM, as discussed above). Alternatively, the shadow kill indication may be a signal and may be associated with the correct load by the reservation stations 24 and the execute units 28 based on the load pipeline 60 that issues the shadow kill and the number of pipeline stages/clock cycles between the dependent release 64 and the shadow kill 66.

As illustrated in FIGS. 2-4, the LSD detect circuit 50 may detect the ordering violations for a load at the FW stage in this embodiment (e.g. at the stage corresponding to the close of the shadow kill window, LSD Detect 68 in FIGS. 2-4). The address information for stores in various stages of the store pipeline 62 may be compared to corresponding address information for the load in the FW stage to detect possible ordering violations for replay (and shadow kill).

The address information that is available at a given stage of the store pipeline 62 may vary, and thus the accuracy of the ordering violation detection in the LSD detect circuit 50 may vary as well. For example, in FIG. 2, the store address op may be in the AT stage when the corresponding load op is in the FW stage. As mentioned above, the virtual address is generated in the AT stage. The physical address is not yet available.

Accordingly, a virtual address compare may be supported for a store address op in the AT stage. Additionally, because the virtual address is being generated in the AT stage, it may be difficult to include size information in the comparison from a timing perspective. Accordingly, in an embodiment, the LSD detect circuit 50 may compare the virtual address of the store address op to the virtual address of the load and detect an ordering violation if the comparison indicates equality (and the store address op is older than load op). Overlapping cases in which the virtual addresses are not equal, but based on the size information there is an overlap of at least one byte between the store address op and the load, may not be detected.

FIG. 3 illustrates the case in which the store address op is at the DT stage when the load op is in the FW stage. As described above, the physical address becomes available in the DT stage (assuming a hit in the TLB for the store address op). However, the physical address may not become available until late in the clock cycle, from a timing standpoint. Accordingly, the virtual address may be compared for a store address op in the DT stage as well. However, since the virtual address was generated in the AT stage, there may be time in the DT stage to include the size information to detect partially overlapping cases. Thus, the detection of an ordering violation for a store address op in the DT stage may be more accurate than the detection for a store address op in the AT stage, in this embodiment.

FIG. 4 illustrates the case in which the store address op is at the DD stage when the load op is in the FW stage. Since the physical address became available in the DT stage, the physical address may be used for the comparison for the store address op in the DD stage. The size information may also be used. Accordingly, the detection of the ordering violation may be the most accurate for the store address op in the DD stage. As can be seen from the above discussion, the accuracy of the ordering violation detection for replay may increase as the store address op progresses down the pipeline.

It is noted that FIGS. 2-4 illustrate the detection of ordering violations for a load op that is issued prior to a store op. Other embodiments may also detect an ordering violation for a load op that is issued at a same clock cycle as a store op (e.g. comparing the addresses between the two FW stages). Such detection may cause a replay of the load op as well.

Figure 5:
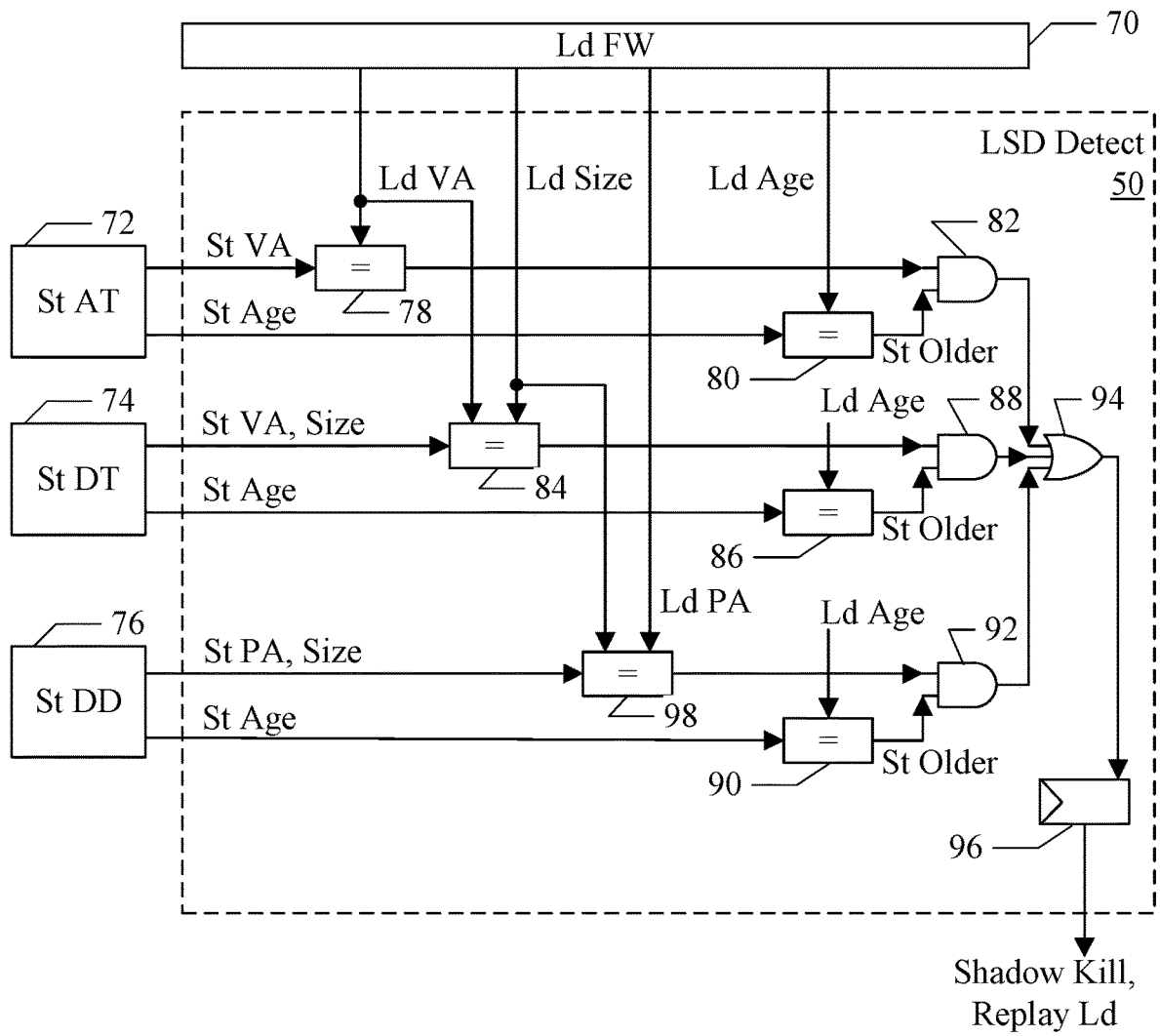
FIG. 5 is a block diagram of one embodiment of a load/store ordering violation detector shown in FIG. 1, in greater detail.

FIG. 5 is a block diagram of one embodiment of the LSD detect circuit 50 in greater detail for one load pipeline, having the FW stage 70 as shown in FIG. 5, and one store pipeline having the AT, DT, and DD stages 72, 74, and 76. Similar circuitry may be provided in the LSD detect circuit 50 for each load pipeline and store pipeline. For example, if there are 3 load pipelines and 2 store pipelines, the circuitry shown in FIG. 5 may be repeated 6 times to permit load ops in each FW stage of the load pipelines to be compared to addresses in the AT, DT, and DD stages of each store pipeline.

As illustrated in FIG. 5, the LSD detect circuit 50 may receive the virtual address of the load op ("Ld VA"), the physical address of the load op ("Ld PA"), the size information for the load op ("Ld Size") and an age indicator for the load op ("Ld Age") from the FW stage 70 of the load pipeline. The LSD detect circuit 50 may also receive the virtual address of a store address op ("St VA") and the age indicator for the store address op ("St Age") from the AT stage 72 of the store pipeline. The LSD detect circuit 50 may receive the virtual address of another store address op and corresponding size information ("St VA, Size") and an age indicator ("St Age") for the store address op from the DT stage 74. The LSD detect circuit 50 may further receive the physical address of yet another store address op and corresponding size information ("St PA, Size") and an age indicator ("St Age") for the store address op from the DD stage 76. It is noted that, in a given clock cycle, if there are store address ops in the AT stage 72, DT stage 74, and/or DD stage 76, the store address ops correspond to different store ops and the store addresses correspond to the different store ops.

More particularly, a comparator circuit 78 (more briefly, "comparator") is coupled to the Ld VA from stage 70 and the St VA from stage 72. The comparator 78 may perform an equality compare, indicating a match if the VAs are numerically equal. A comparator 80 is coupled to the Ld Age indicator from the stage 70 and the St Age indicator from the stage 72, and may compare the age indicator to determine if the store address op is older than the load op. Thus, the comparator circuit 80 may perform a greater than/less than compare on the age indicators. The VAs are equal (comparator 78) and the store address op is older (comparator 80), as indicated by AND gate 82, then a first case of ordering violation may be detected. That is, a hit on an older store op in the stage 72 may be detected for the load op in the stage 70.

The age indicators may be any values that indicate the relative age of ops, according to program order of the instructions being executed in the processor 12. As mentioned previously, the RNUMs may be compared to determine age. Other age indicators may be used in other embodiments. The size information may also indicate the size in any desired fashion. For example, the size information may be a byte count indicating the number of bytes, beginning at the corresponding address, that are accessed by the load or store. Alternatively, the size information may be byte masks indicating which bytes within a cache line or other fixed-sized block (e.g. a bank) are accessed by the load or store. Any combination of one or more values that identify the size of the operation may be used.

A comparator 84 is coupled to the St VA and size information from the stage 74 and the Ld VA and size information from the stage 70. The comparator 84 may detect a match if at least one byte indicated by the Ld VA and load size is written by the store corresponding to the store address op, as indicated by the St VA and size. The comparator 84 may implement any mechanism for the comparison. For example, the portions of the Ld VA and the St VA that indicate a cache line may be compared for equality, and the size information and cache line offset portions of the VAs may be decoded into masks identifying the bytes within the cache line that are written by the store or read by the load. The masks may be bitwise ANDed, and the resulting bits may be ORed, to determine if at least one byte is updated. In other embodiments, the portions of the Ld VA and St VA that indicate a bank of the data cache 16 may be compared, and the size information and bank offset portions of the VAs may be decoded into masks identifying the bytes within the bank. The size information provided by the stages 70, 74, and 76 may be the masks, in another embodiment. A comparator 86 may compare the load and store age indicators. If the comparator 84 indicates an overlap between the load and store of at least one byte, and the store is older than the load (AND gate 88), a second case of ordering violation may be detected. That is, a hit on an older store op in the stage 74 may be detected for the load op in the stage 70. It is noted that the comparison of the virtual addresses by the comparator 78 also detects an overlap of at least one byte, since the addresses are equal. If the sizes are the same, the overlap is a complete overlap. However, partial overlaps where the virtual addresses differ in one or more least significant bits may be not be detected by the comparator 78.

A comparator 98 similar to the comparator 84 may compare the St PA and size information from the DD stage 76 to the Ld PA and size information from the stage 70 and detect a match if at least one byte read by the load is written by the store. The comparator 90 may compare the age indicators from the stages 70 and 76, and if the store is older than the load there is a match (AND gate 92), a third case of ordering violation may be detected. That is, a hit on an older store op in the stage 76 may be detected for the load op in the stage 70. The ordering violations may be logically combined (OR gate 94) to generate the shadow kill for ordering violation and the load replay. In this embodiment, the shadow kill and replay may be transmitted in the subsequent clock cycle, and thus may be captured by the flop 96 coupled to the output of the OR gate 94. In another embodiment, the output of the OR gate 94 may be used as a load replay directly, and the shadow kill may be transmitted in the following clock cycle.

It is noted that, while specific circuitry is shown in FIG. 5 as an example, any other circuitry may be used, including any Boolean equivalents of the illustrated circuitry.

Figure 6:
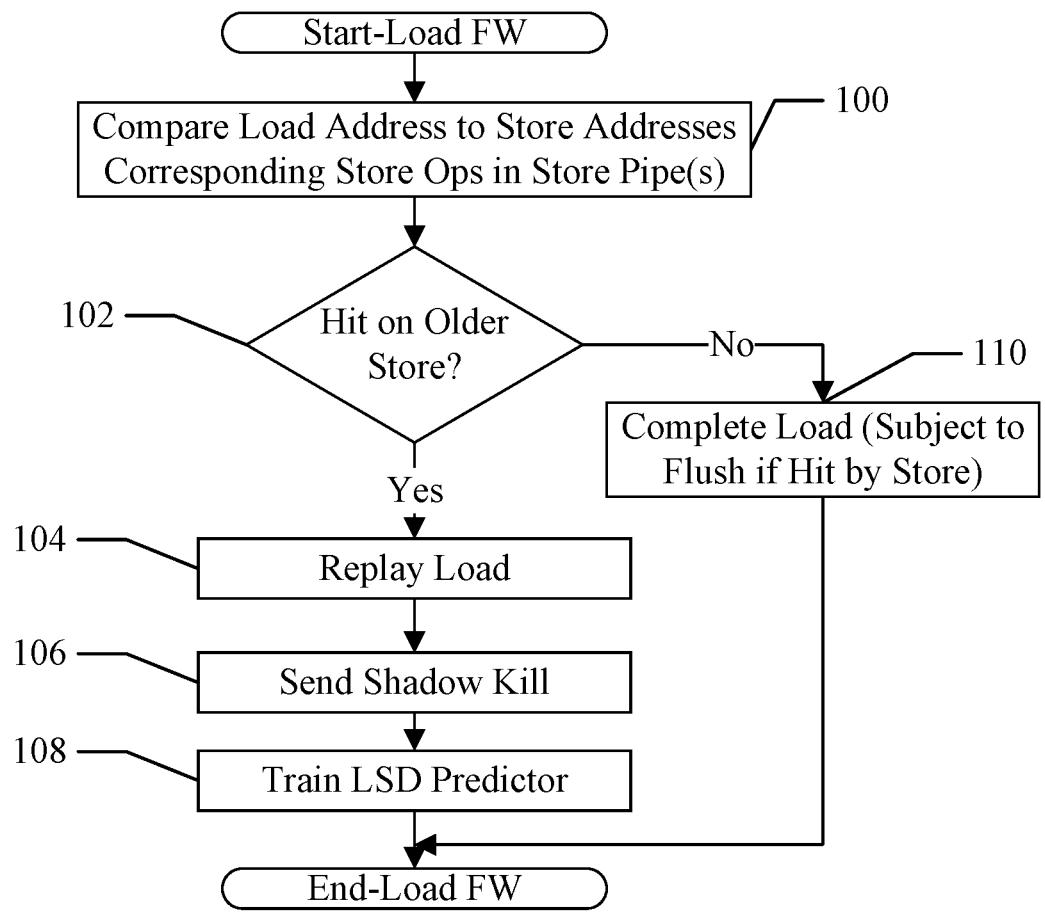
FIG. 6 is a flowchart illustrating operation of one embodiment of the load/store ordering violation detector.

FIG. 6 is a flowchart illustrating operation of one embodiment of the LSD detect circuit 50 when a load op is in the FW stage of one of the load pipelines. Similar operation may be performed in parallel for each load pipeline when multiple load pipelines are implemented. While the blocks are shown in a particular order for ease of understanding, other orders may be used. Blocks may be performed in parallel in combinatorial logic in the LSD detect circuit 50. Blocks, combinations of blocks, and/or the flowchart as a whole may be pipelined over multiple clock cycles. The LSD detect circuit 50 may be configured to implement the operation shown in FIG. 6.

The LSD detect circuit 50 may compare the load address information for the load at the FW stage to corresponding address information for store ops (e.g. the store address ops) in the store pipeline or pipelines (block 100). If the load is a hit on an older store in one of the store pipelines (decision block 102, "yes" leg), the LSD detect circuit 50 may replay the load (block 104), send a shadow kill for the load to the reservation stations 24/execution units 28 (block 106), and may send a training event for the load op and the corresponding store op to the LSD predictor 52 (block 108). The training event may not be implemented in other embodiments. A load may be a hit on an older store if the comparison of the address information for the load and the corresponding address information for the store indicate that at least one byte read by the load is written by the store. The detection may have varying degrees of accuracy depending on which stage the store address op is in when the hit is detected, as previously discussed. On the other hand, if the load is not a hit on an older store in the store pipe (decision block 102, "no" leg), the LSD detect circuit 50 may allow the load to complete (block 110). The load may be replayed due to other replay causes detected by other circuitry in the LSU 20, in which case the load may not complete. Additionally, completed loads may still be subject to flush if they are hit by a store at a later time (e.g. a store address op that is not in the pipe when the load op is in the FW stage, or cases in which the less accurate in-pipe comparisons do not detect an ordering violation), or for other flush causes in various embodiments.

Figure 7:
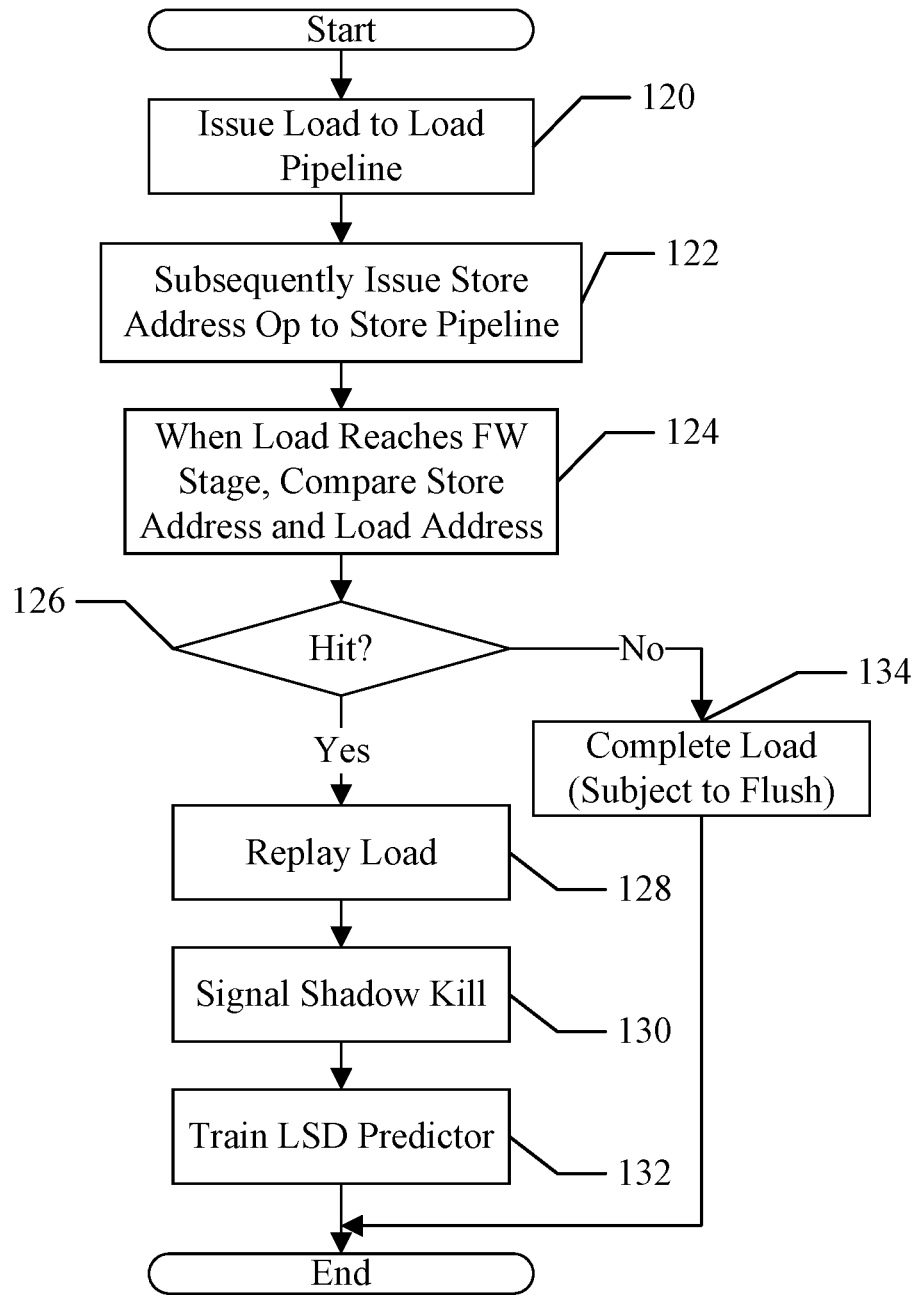
FIG. 7 is another flowchart illustrating operation of one embodiment of the load/store ordering violation detector.

FIG. 7 is a flowchart illustrating one embodiment of a method. While the blocks are shown in a particular order for ease of understanding, other orders may be used. Blocks may be performed in parallel in combinatorial logic in the processor 12. Blocks, combinations of blocks, and/or the flowchart as a whole may be pipelined over multiple clock cycles.

The LSU 20, and more particularly the RS 36, may issue a load op to a load pipeline (block 120). Subsequently (e.g. in a subsequent clock cycle), while the load op is in the load pipeline, the LSU 20, and more particularly the RS 36, may issue a store address op to a store pipeline (block 122). When the load op reaches the FW stage of the load pipeline, the load address information may be compared to corresponding store address information corresponding to the store address op, e.g. by the LSD detect circuit 50 (block 124). If the comparison results in a hit (e.g. the store op writes at least one byte that is read by the load op and the store op is older than the load) (decision block 126, "yes" leg), the LSU 20, and more particularly the LSD detect circuit 50, may cause the load to be replayed (block 128), signal a shadow kill with respect to the load (block 130), and train the LSD predictor 52 for the load/store pair (block 132). As mentioned above, in some embodiments, the training event is not generated. On the other hand, if there is no hit according to the comparison (decision block 126, "no" leg), the load may be completed (assuming that it is not replayed for another replay cause) (block 134). Completed loads may still be subject to flush if they are hit by a store at a later time (e.g. a store address op that is not in the pipe when the load op is in the FW stage, or cases in which the less accurate in-pipe comparisons do not detect an ordering violation), or for other flush causes in various embodiments.

Figure 8:
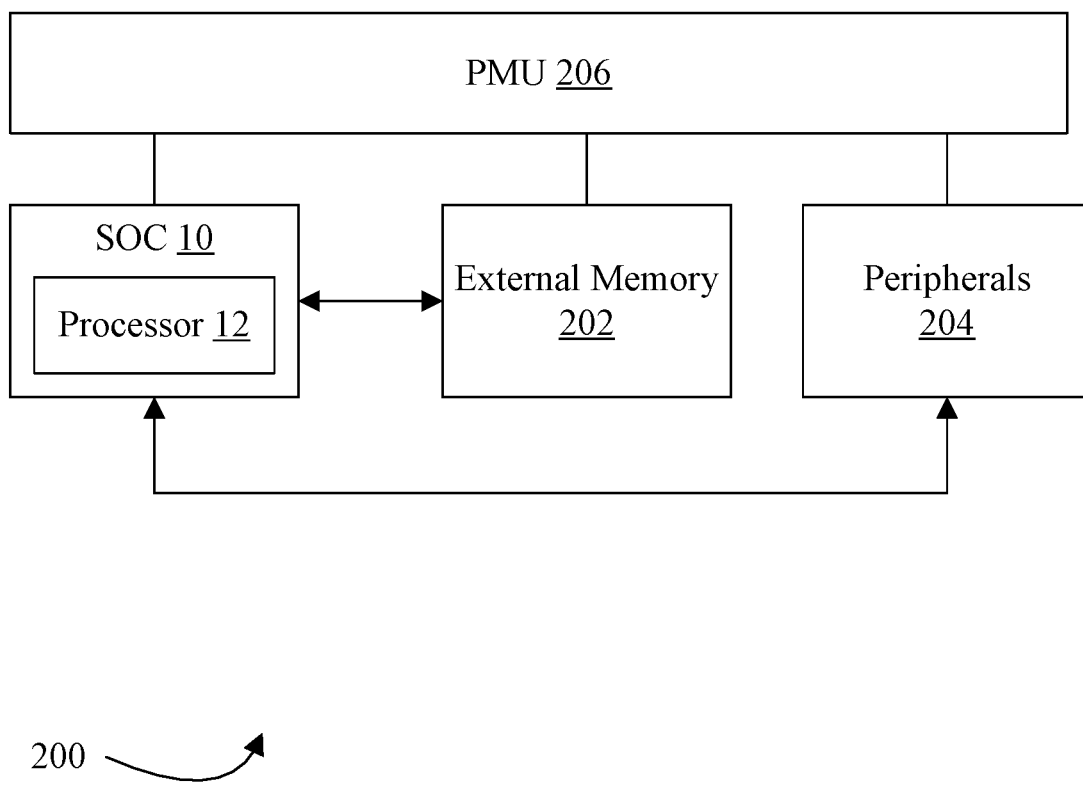
FIG. 8 is a block diagram of one embodiment of a system.

FIG. 8 is a block diagram of one embodiment of a system 200. In the illustrated embodiment, the system 200 includes at least one instance of an integrated circuit (IC) 10, which may be a system on a chip (SOC) 10 in this embodiment, coupled to one or more peripherals 204 and an external memory 202. A power supply 206 is provided which supplies the supply voltages to the SOC 10 as well as one or more supply voltages to the memory 202 and/or the peripherals 204. The SOC 10 may include one or more instances of the processor 12. In other embodiments, multiple SOCs 10 may be provided with instances of the processor 12 them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device. In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

The external memory 202 may include any type of memory. For example, the external memory 202 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 202 may include one or more memory modules to which the memory devices are mounted, such as single inline memory modules (SIMMs), dual inline memory modules (DIMMs), etc. Alternatively, the external memory 202 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A load/store unit comprising:
at least one load pipeline, wherein the at least one load pipeline is configured to execute load operations;
at least one store pipeline, wherein the at least one store pipeline is configured to execute store operations; and
a detect circuit coupled to the at least one load pipeline and the at least one store pipeline, wherein the detect circuit is configured to compare a plurality of store addresses corresponding to store operations in a plurality of pipeline stages of the at least one store pipeline to one or more load addresses corresponding to a first load operation in a first stage of the at least one load pipeline, wherein the first load operation was issued to the at least one load pipeline prior to the store operations being issued to the at least one store pipeline, and wherein the detect circuit is configured to cause a replay of the first load operation based on a hit between a first store address of the plurality of store addresses on a corresponding load address of the one or more load addresses and further based on a first store operation corresponding to the first store address being older than the first load operation in program order, wherein a replay comprises reexecution of the first load operation without refetching the load operation and without flushing operations subsequent to the load operation from a processor including the load/store unit, and wherein the first stage of the at least one load pipeline corresponds to an end of a window in which dependent operations on the load operation in the first stage are cancellable without flushing and refetching the dependent operations.

2. The load/store unit as recited in claim 1 wherein the one or more load addresses comprise a load physical address and a load virtual address, and wherein the plurality of store addresses comprise store virtual addresses and store physical addresses, and wherein the first store address is a store virtual address for at least one stage of the plurality of pipeline stages and the first store address is a store physical address for at least one other stage of the plurality of pipeline stages.

3. The load/store unit as recited in claim 2 wherein the first store address is the store virtual address and the corresponding load address is the load virtual address if the first store operation is in an initial stage of the plurality of pipeline stages.

4. The load/store unit as recited in claim 3 wherein the hit is detected based on equality between the first store address and the corresponding load address.

5. The load/store unit as recited in claim 3 wherein the first store address is the store virtual address and the corresponding load address is the load virtual address if the first store operation is in a second stage of the plurality of pipeline stages that is subsequent to the initial stage, and wherein size data for the first store operation and the first load operation are included in the hit detection, and the hit is detected if at least one byte written by the first store operation is read by the first load operation.

6. The load/store unit as recited in claim 5 wherein the first store address is the store physical address and the corresponding load address is the load physical address if the first store operation is in a third stage of the plurality of pipeline stages that is subsequent to the second stage, and wherein size data for the first store operation and the first load operation are included in the hit detection, and the hit is detected if at least one byte written by the first store operation is read by the first load operation.

7. The load/store unit as recited in claim 1 wherein the load/store unit is configured to signal the cancellation of the dependent operations responsive to the hit.

8. The load/store unit as recited in claim 7 wherein the cancellation is signaled from a second stage of the at least one load pipeline that is subsequent to the first stage in the at least one load pipeline.

9. The load/store unit as recited in claim 1 further comprising a queue coupled to the at least one load pipeline and the at least one store pipeline and having an entry allocated to the first load operation, wherein the queue is configured to compare a store physical address for the first store operation a load physical address for the first load operation in the entry and to cause a flush of the first load operation responsive to the first load operation not having been replayed, detecting a hit between the load physical address in the entry and the store physical address and the first store operation being older than the first load operation, wherein the first load operation and subsequent operations are refetched responsive to the flush.

10. The load/store unit as recited in claim 9 wherein the hit detection includes size data for the first store operation and the first load operation and the hit is detected if at least one byte written by the first store operation is read by the first load operation.

11. A method comprising:
issuing a first load operation to a first load pipeline in a load/store unit;
issuing a first store operation to a first store pipeline in the load/store unit subsequent to issuing the first load operation, wherein the first store operation is older than the first load operation in program order;
comparing a first store address corresponding to the first store operation to a first load address corresponding to the first load operation responsive to the first load operation reaching a first stage of the first load pipeline, wherein the first store address and the first load address are virtual addresses responsive to the first store operation being in a second pipeline stage of the first store pipeline at a time that the first load operation reaches the first stage of the first load pipeline, and wherein the first store address and the first load address are physical addresses responsive to the first store operation being in a third pipeline stage of the first store pipeline at the time that the first load operation reaches the first stage of the first load pipeline;
detecting a hit responsive to the comparing; and
replaying the first load operation responsive to the hit, wherein a replay is performed without refetching the first load operation and without flushing operations subsequent to the first load operation.

12. The method as recited in claim 11 wherein the hit is detected based on equality between the first store address and the first load address at the second pipeline stage.

13. The method as recited in claim 11 wherein the first store address and the first load address are virtual addresses responsive to the first store operation being in a fourth pipeline stage of the first store pipeline that is between the second pipeline stage and the third pipeline stage, and wherein size data for the first store operation and the first load operation are included in the detecting the hit at the fourth pipeline stage, and the hit is detected if at least one byte written by the first store operation is read by the first load operation.

14. The method as recited in claim 11 wherein size data for the first store operation and the first load operation are included in detecting the hit at the third pipeline stage, and the hit is detected if at least one byte written by the first store operation is read by the first load operation.

15. The method as recited in claim 11 wherein the first stage of the first load pipeline corresponds to an end of a window in which dependent operations on the first load operation in the first stage are cancellable without flushing and refetching the dependent operations, and the method further comprises signaling the cancellation of the dependent operations responsive to the hit.

16. A load/store unit comprising:
at least one load pipeline, wherein the at least one load pipeline is configured to execute load operations, and wherein a first stage of the at least one load pipeline corresponds to an end of a shadow kill window in which it is possible to cancel dependent operations on the load operation in the first stage; and
at least one store pipeline, wherein the at least one store pipeline is configured to execute store operations, and wherein a plurality of stages of the at least one store pipeline have address information available for a store address written by the store operations in the plurality of stages;
a detect circuit coupled to the at least one load pipeline and the at least one store pipeline, wherein the detect circuit is configured to compare the address information from the plurality of stages of the at least one store pipeline to corresponding address information for the load operation in the first stage, and wherein the detect circuit is configured to cause a replay of the load operation in the first stage responsive to detecting a hit on a first store operation in one of the plurality of stages of the at least one store pipeline based on the comparison of the address information and further responsive to detecting that the first store operation is older than the load operation in the first stage, wherein a replay comprises reexecution of the load operation without refetching the load operation and without flushing operations subsequent to the load operation from a processor including the load/store unit; and
a queue coupled to the at least one load pipeline and the at least one store pipeline and having an entry allocated to the load operation, wherein the queue is configured to compare the store address for a store operation at a second stage of the at least one store pipeline to a load address for the load operation in the entry and to cause a flush of the load operation responsive to the load operation not having been replayed by the detect circuit, detecting a hit between the load address in the entry and the store address, and the store operation being older than the load operation, wherein the load operation and subsequent operations are refetched responsive to the flush.

17. The load/store unit as recited in claim 16 wherein the address information comprises a virtual address and a physical address.

18. The load/store unit as recited in claim 17 wherein the virtual address is available before the physical address, and wherein the physical address is used in the comparison by the detect circuit is the physical address is available.

19. The load/store unit as recited in claim 16 wherein the load/store unit is configured to signal the cancellation of the dependent operations responsive to the hit.

20. The load/store unit as recited in claim 19 wherein the cancellation is signaled from a third stage of the at least one load pipeline that is subsequent to the first stage in the at least one load pipeline.

* * * * *